(12) United States Patent
Graichen et al.

(10) Patent No.: US 7,268,173 B2
(45) Date of Patent: Sep. 11, 2007

(54) FREE-RADICALLY RADIATION-CURABLE, SOLVENT-FREE AND PRINTABLE PRECURSOR OF A PRESSURE-SENSITIVE ADHESIVE

(75) Inventors: Andreas H. Graichen, Hilden (DE); Siegfried R. Goeb, Willich (DE)

(73) Assignee: 3M Innovative Properties Company, St. Paul, MN (US)

( * ) Notice: Subject to any disclaimer, the term of this patent is extended or adjusted under 35 U.S.C. 154(b) by 253 days.

(21) Appl. No.: 10/513,125

(22) PCT Filed: May 1, 2003

(86) PCT No.: PCT/US03/13551

§ 371 (c)(1), (2), (4) Date: Oct. 29, 2004

(87) PCT Pub. No.: WO03/066821

PCT Pub. Date: Aug. 14, 2003

(65) Prior Publication Data

US 2005/0176842 A1 Aug. 11, 2005

(30) Foreign Application Priority Data

Jun. 19, 2002 (EP) .................................. 02013604

(51) Int. Cl.
*C08F 2/46* (2006.01)
*B32B 7/12* (2006.01)

(52) U.S. Cl. .................... 522/96; 522/90; 522/111; 522/112; 522/113; 522/114; 522/120; 522/121; 522/150; 522/152; 522/153; 522/173; 522/174; 522/178; 522/182; 428/355 CN; 428/355 AC; 428/355 EN; 428/423.1; 428/500; 428/508; 428/516; 428/207.1; 428/208.4

(58) Field of Classification Search .................. 522/90, 522/96, 109, 110, 111, 112, 104, 107, 150, 522/151, 152, 153, 174, 182, 114, 113, 120, 522/121, 173, 178; 428/355 EN, 355 AC, 428/355 CN, 423.1, 500; 427/508, 516, 427/207.1, 208.4
See application file for complete search history.

(56) References Cited

U.S. PATENT DOCUMENTS

| | | | |
|---|---|---|---|
| 4,174,307 A | 11/1979 | Rowe | |
| 4,305,854 A | 12/1981 | Rowe | |
| 5,847,021 A | 12/1998 | Tortorello et al. | |
| 6,180,200 B1 | 1/2001 | Ha et al. | |
| 6,482,869 B1 * | 11/2002 | Bolte et al. | ................... 522/35 |

FOREIGN PATENT DOCUMENTS

| | | |
|---|---|---|
| DE | 198 53 813 A1 | 6/1999 |
| GB | 1 580 864 | 12/1980 |
| GB | 2 283 748 A | 5/1995 |
| JP | 2001-226645 | 8/2001 |

* cited by examiner

*Primary Examiner*—Sanza L McClendon
(74) *Attorney, Agent, or Firm*—Thomas M. Spielbayer (57) ABSTRACT

The present invention relates to a free-radically radiation-curable, solvent-free and printable precursor of a pressure-sensitive adhesive, the precursor comprising: (i) 30-75 wt. % of one or more mono(meth)acrylate functional oligomer compounds at least one of said oligomer compounds comprising at least one urethane bond, (ii) 0-15 wt % of one or more poly(meth)acrylate functional oligomer compounds, (iii) 5-45 wt. % of one or more monomer compounds comprising one ethylenically unsaturated group, (iv) 0-5 wt. % of one or more monomer compounds comprising two or more ethylenically unsaturated groups, and (v) an effective amount of one or more free radical photoinitiators, wherein the percentages which are percentages by weight with respect to the mass of the precursor, are selected so that the precursor has a dynamic viscosity at 20° C. and at a shear rate of 100 $s^{-1}$ of between 300 to 15,000 mPa·s.

20 Claims, 1 Drawing Sheet

*Fig. 1*

FREE-RADICALLY RADIATION-CURABLE, SOLVENT-FREE AND PRINTABLE PRECURSOR OF A PRESSURE-SENSITIVE ADHESIVE

FIELD OF THE INVENTION

The present invention relates to a free-radically radiation-curable, solvent-free and printable precursor of a pressure-sensitive adhesive. The present invention also refers to the pressure-sensitive adhesive obtainable by curing said precursor by actinic irradiation and, in particular, by UV-irradiation, and to a method of assembling a first substrate to a second substrate by using said precursor or said pressure-sensitive adhesive, respectively.

BACKGROUND OF THE INVENTION

Pressure-sensitive adhesives can be applied to a substrate as pre-cured adhesive tapes which may be die-cut to the required shape. While this technique is convenient for many technical applications and does, in particular, usually not require any in-situ curing step, it may be disadvantageous in other technical applications for the following reasons:

Two-sided adhesive tapes usually require the use of one or more release liners which have to be discarded upon application of the adhesive tape. When die-cutting the adhesive tape to a desired shape, the excess tape has to be discarded as well.

Especially in the electronics industry the shapes of the substrates to be adhered, tend to get smaller and more complicated so that the die-cutting of the adhesive tape tends to become more difficult and technically demanding.

In view of this it has been suggested to use liquid adhesives which can be applied, for example, by a printing process. U.S. Pat. No. 6,180,200 B1 discloses, for example, a hybrid free-radically and cationically curable pressure-sensitive adhesive composition which can be applied by screen printing and is used for bonding digital versatile disks (DVD). The composition comprises acrylate oligomers and, optionally, acrylate monomers which are copolymerized with a cationic epoxy resin system. The acrylate component of the composition is cured by UV irradiation. Then the two DVD halves are pressed together and the epoxy component of the composition continues to cure cationically. The "dark" cure time of the epoxy component typically is 24 h which is, however, not acceptable for many applications.

JP 2001/226,645-A discloses a composition comprising an acrylate oligomer, an acrylate monomer and a photoinitiator. The composition has a viscosity of between 300 to 600 mPa·s so that it can be applied, for example, by gravure offset printing. Upon curing, the composition provides a polymer material which is slightly self-adhering but does not exhibit any pressure-sensitive adhesive properties.

U.S. Pat. No. 4,174,307 and U.S. Pat. No. 4,305,854 disclose a UV radiation room temperature curable monomeric substantially water-insoluble composition comprising polyurethane compounds having two or more olefinically unsaturated groups, and a photoinitiator. The compositions can be printed and used, for example, as vehicles for printing inks. The shear values of the cured polymers do not meet all practical requirements, however, It was therefore an object of the present invention to provide a UV-curable solvent-free precursor of a pressure-sensitive adhesive which can be applied by printing techniques such as, for example, screen-printing or flexo-printing and which does not exhibit the shortcomings of the compositions of the prior art or exhibits them to a lesser degree only. It is another object of the present invention to provide such a precursor which can be cured in short curing times of preferably less than 5 minutes and especially preferably of less than 1 minute. It is another object of the present invention to provide such a precursor which upon curing provides a pressure-sensitive adhesive having high values of static shear from various substrates including ABS (acrylonitrile-butadiene-styrene) and/or high shear adhesion failure temperatures (SAFT) from various substrates including stainless steel. Other objects of the present invention can be taken from the following detailed specification of the invention.

BRIEF DESCRIPTION OF THE INVENTION

The present invention relates to a free-radically radiation-curable, solvent-free and printable precursor of a pressure-sensitive adhesive, the precursor comprising:

(i) 30-75 wt. % of one or more mono(meth)acrylate functional oligomer compounds at least one of said oligomer compounds comprising at least one urethane bond, (ii) 0-15 wt. % of one or more poly(meth)acrylate functional oligomer compounds, (iii) 5-45 wt. % of one or more monomer compounds comprising one ethylenically unsaturated group, (iv) 0-5 wt. % of one or more monomer compounds comprising two or more ethylenically unsaturated groups, and (v) an effective amount of one or more free radical photoinitiators, wherein the percentages which are percentages by weight with respect to the mass of the precursor, are selected so that the precursor has a dynamic viscosity at 20° C. and at a shear rate of 100 s$^{-1}$ of between 300 to 15,000 mPa·s.

The present invention also refers to a pressure-sensitive adhesive which is obtainable by subjecting the precursor of the present invention to actinic irradiation and, in particular, to UV irradiation.

The present invention furthermore refers to a method of adhering a UV-transparent substrate to another substrate comprising the steps of:

(i) applying the precursor according to the present irradiation to one of the substrates, (ii) subjecting the precursor to actinic irradiation and/or UV irradiation using a radiation dose so that the precursor is cured only partly, (iii) interrupting the treatment with actinic and/or UV irradiation and assembling the two substrates against each other with the partly polymerized precursor being sandwiched between the two substrates, and (iv) subjecting the assembly to actinic and/or UV irradiation through the UV-transparent substrate using a radiation dose sufficiently high to fully cure the precursor.

The present invention furthermore refers to a method of adhering a first substrate to a second substrate comprising the steps of:

(i) applying the precursor according to the present invention to a substrate,
(ii) subjecting the precursor to actinic and/or UV irradiation to fully cure the precursor and
(iii) adhering the second substrate to the exposed pressure-sensitive adhesive on the first substrate.

DETAILED DESCRIPTION OF THE INVENTION

The term oligomer compounds as used above and below refers to relatively low molecular weight polymeric compounds having a weight average molecular weight $M_w$ of between 1,000 to 35,000 and more preferably between 1,000 and 30,000. Oligomeric compounds are typically liquid at room temperature and ambient pressure whereby the dynamic viscosity is preferably less than 500 Pa·s and more preferably less than 200 Pa·s at 20° C. and a shear rate of $s^{-1}$.

The term monomer compounds as used above and below refers to low weight building units able to participate in a polymerisation reaction to form a polymeric material. The weight average molecular weight $M_w$ of monomer compounds is preferably less than 1,000 and more preferably less than 750. Ethylenically unsaturated monomers are able to form a polymer by reacting with themselves via a free-radical polymerization mechanism.

In case of oligomers, the term "mono(meth)acrylate functional" as used above and below refers to oligomers having an average mono(methacrylate) functionality of between 0.7 and 1.3, more preferably of between 0.8 and 1.2 and especially preferably of between 0.9 and 1.1. In case of oligomers, the term "poly(meth)acrylate functional" as used above and below refers to oligomers having an average acrylate functionality of at least 1.5 and more preferably of at least 1.8. The average (meth)acrylate functionality of such poly(meth)acrylate functional oligomers preferably is lower than 5, more preferably lower than 3 and especially preferably lower than 2.5.

Above and below, a substrate is denoted as at least partially (or partly) transparent to actinic irradiation and/or UV-irradiation if the ratio of the intensity of such actinic irradiation and/or UV irradiation after passing the at least partially transparent substrate, is at least 50% and more preferably at least 60% with respect to the intensity of the impinging irradiation.

The free-radically radiation-curable, solvent-free and printable precursor of the present invention comprises as a first component (i) one or more mono-methacrylate functional oligomer compounds wherein at least one of said oligomer compounds comprises at least one urethane bond The mono(meth)acrylate functional oligomers useful in the present invention can be branched or essentially linear, and the (meth)acrylate functional group or groups, respectively, can be terminal groups and/or pendant side groups bonded to the oligomer backbone. The composition of the oligomeric backbone is not critical and it can be based, for example, on a polyether, polyester including polycarbonate, polyolefin, or on a copolymer thereof. It is also possible that the oligomeric backbone comprises one or more oligomeric blocks such as, for example, polyether or polyester blocks which are connected to each other, for example, by urethane bonds.

The oligomeric backbone of the mono(meth)acrylate functional oligomers of component (i) is preferably selected so that the glass transition temperature of a homopolymer obtained by polymerising such oligomers is between –30 and 100° C. and more preferably between –30 and 70° C.

The weight average molecular weight $M_w$ of the mono (meth)acrylate functional oligomer compounds of component (i) is preferably between 1,500 and 35,000 and more preferably between 3,000 and 30,000.

Mono(meth)acrylate functional oligomers can be prepared by known synthetic methods.

Mono(meth)acrylate functional polyether oligomers can be obtained, for example, by polymerising cyclic ether monomers such as, for example, oxiranes such as ethylene oxide or propylene oxide or tetrahydrofurane using α,ω-hydroxy-(meth)acrylate functional compounds such as HEA or HEMA (2-hydroxyethyl(meth)acrylate) as a starter or termination compound. The reaction provides an α,ω-hydroxy-mono(meth)acrylate functional polyether oligomer compound.

Mono(meth)acrylate functional polyester oligomers can be obtained, for example, by polymerizing cyclic esters such as, for example, ε-caprolactone or pivalolactone using α,ω-hydroxy-(meth)acrylate functional compounds such as HEA or HEMA as a starter or termination compound. The reaction provides an α,ωhydroxy-mono(meth)acrylate functional polyester oligomer compound.

The methods providing mono(meth)acrylate functional oligomers specified above are intended to illustrate the invention without limiting it. The person skilled in the art can easily identify and apply other synthetic methods for preparing mono(meth)acrylate functional oligomers comprising a polyether, a polyester, a polyether/polyester or another backbone.

At least one of the mono(meth)acrylate functional oligomers comprises at least one and more preferably at least two urethane bonds.

Mono(meth)acrylate functional oligomers comprising at least one urethane bond can be obtained by reacting a monohydroxy functional oligomer compound in a first step (a) with an excess of an diisocyanate compound.

Step (a):

In the reaction step (a), ① and R' schematically denote the backbone or molecular structure, respectively, of the monohydroxy functional oligomer compound and the diisocyanate compound. The monohydroxy functional oligomer compound can be, for example, a monohydroxy functional polyether or polyester oligomer, respectively.

Monohydroxy functional polyether oligomers can be obtained, for example, by reacting cylic ethers such as, for example, oxiranes or tetrahydrofuranes with an alcohol compound R—OH as a starter or termination compound. This can be exemplified as follows:

wherein R is an optionally substituted alkyl group.

Similarly, monohydroxy functional polyester oligomers can be obtained, for example, by reacting cyclic esters such as, for example, ε-caprolactone or pivalolactone with an alcohol compound as a starter or termination compound. Monohydroxy functional polyester oligomers can also be obtained, for example, by an esterification or trans-esterification respectively, of α,ω-hydroxy-carbonic acid functional polyester oligomers.

The diisocyanate compounds used in step (a) preferably comprise 1-5, especially 1-2 diisocyanate compounds which are preferably selected from a group of diisocyanates comprising 1,4-butylene diisocyanate, 1,6-hexamethylene diisocyanate, cyclopentylene-1,3-diisocyanate, 4,4'-dicyclohexylmethane diisocyanate, isophorone diisocyanate, cyclohexene-1,4-diisocyanate, 2,4-tolylene diisocyanate, 2,6-tolylene diisocyanate, 4,4'-methylene bis(phenyl isocyanate), 2,2-diphenylpropane-4,4'-diisocyanate, p-phenylene diisocyanate, m-phenylene diisocyanate, xylene diisocyanate, 1,4-naphthylene diisocyanate, 1,5-naphthylene diisocyanate 4,4'-diphenyl diisocyanate, azobenzene-4,4'-diisocyanate, m- or p-tetramethylxylene diisocyanate and 1-chlorobenzene-2,4-diisocyanate.

The mono-isocyanate functional oligomer compound of formula I thus obtained is then reacted in step (b) with an α,ω-hydroxy-(meth)acrylate functional compound such as, for example, HEA or HEMA to provide a mono(meth) acrylate functional oligomer compound of formula II useful in component (i) of the precursor of the present invention:

The (meth)acrylate functionality of compound II thus obtained is essentially 1.

Alternatively, it is also possible to prepare mono(meth) acrylate functional oligomer compounds by reacting a monohydroxy functional oligomer such as, for example, a monohydroxy functional polyether oligomer or a monohydroxy functional polyester oligomer, with an α,ω-isocyanato-(meth)acrylate functional compound such as, for example, isocyanatoethyl(meth)acrylate.

Mono(meth)acrylate functional oligomers comprising at least one urethane bond can also be obtained, for example, by (a)' reacting one or more α,ω-dihydroxy oligomer compounds with an excess of one or more diisocyanate compounds so that one or more adducts of an α,ω-dihydroxy oligomer compound with two diisocyanate compounds are formed whereas the polyurethane polymerization side reaction is effectively suppressed, (b)' reacting an excess of the resulting adducts with an α,ω-hydroxy-(meth)acrylate functional compound such as, for example, HEA or HEMA, and (c)' reacting the reaction product of step (b)' with one or more monohydroxy functional compounds such as, for example, alcohols to provide a mono(meth)acrylate functional oligomer compound of formula III useful in component (i) of the present invention.

The α,ω-dihydroxy oligomer compounds used in step (a) are preferably selected from a group comprising α,ω-dihydroxy polyester oligomers (including α,ω-dihydroxy polycarbonate oligomers) and α,ω-dihydroxy polyether oligomers which each have hydroxy groups at both ends. It is also possible but less preferred to use dihydroxy functional oligomer compounds with two non-terminal hydroxyl groups.

The average molecular weight of the dihydroxy functional oligomer compound is preferably selected so that the desired weight average molecular weight Mw of the resulting monoacrylate functional oligomer is obtained. The weight average molecular weight of the dihydroxy functional oligomer compounds preferably is between 800-34,000 and more preferably between 1,000 and 30,000.

It is possible to use in step (a)' more than one dihydroxy functional oligomer compound although it is usually preferred to use between 1-5 and more preferably between 1-3 of the dihydroxy functional oligomer compounds. A smaller amount of one or more tri- or higher-hydroxy functional oligomer compounds may be used in addition to the dihydroxy functional oligomer compounds although this is usually not preferred because it makes it more difficult to control the functionality of the resulting mono(meth)acrylate functional oligomer.

The di-hydroxy functional polyester oligomer compounds are preferably prepared from one or more alcohols containing at least 2 hydroxyl groups and one or more dicarboxylic acids. Preferred examples of difunctional alcohols include ethylene glycol, 1,3- and 1,2-propylene-glycol, 1,4-butanediol, 1,3-butanediol, 2-methylpentanediol, 1,5-pentanediol, 1,6-pentanediol and 1,12-dodecanediol. The dicarboxylic acids are preferably selected from a group comprising adipic, succinic, sebacic, suberic, methyladipic, glutaric, pimelic, azelaic, thiodipropionic, citraconic and aromatic dicarboxylic acids like, for example, terephthalic and phthalic acid. Furthermore, hydrocarboxylic acids, lactones and carbonates such as, for example, ε-caprolactone and 3-hydroxybutyric acid, may be used for the preparation of polyester diols.

The di-hydroxy functional polyether oligomer compounds preferably are condensation products of one or more alkylene glycols such as, for example, ethylene glycol, 1,2- or 1,3-propylene glycol, 1,4-butanediol, and 1,5-pentanediol. Preferred di-hydroxy functional polyether oligomer compounds are furthermore obtained from tetrahydrofurane, ethylene oxide and/or propylene oxide.

The diisocyanate compounds exemplified above in connection with step (a) can be used in step (a)' as well.

The diisocyanate compounds are used in step (a)' in excess with respect to the di-hydroxy functional oligomer compounds so that the polyurethane polymerization side reaction is effectively suppressed. Preferably, at least 2, and more preferably at least 5 moles and especially preferably at least 8 moles of one or more diisocyanate compounds are used per mole of one or more α,ω-dihydroxy oligomer compounds. The reaction of step (a) can be schematically illustrated as follows:

Step (a)':

wherein ~~~②~~~ and ~~~③~~~ schematically denote the backbone or molecular structure, respectively, of the α,ω-dihydroxy oligomer compound and the diisocyanate compound, respectively.

An excess of the adduct obtained in step (a)' is reacted in step (b)' with an α,ω-hydroxy-(meth)acrylate functional compound such as, for example, HEA or HEMA. Other suitable α,ω-hydroxy-(meth)acrylate functional monomers include, for example, hydroxypropyl(meth)acrylate and hydroxybutyl(meth)acrylate.

The reaction of step (b)' can be schematically be illustrated as follows:

wherein R" is, for example, an optionally substituted alkylene group.

In a final step (c)', the reaction product of step (b)' is reacted with a monohydroxy functional monomer such as, for example, an alcohol compound to provide the mono (meth)acrylate functional oligomer compound of formula III useful in component (i) of the present invention. This reaction step can be schematically visualised as follows:

Step (c)'

R'" is, for example, an optionally substituted alkyl group.

The person skilled in the art can easily select the reaction conditions so that the (meth)acrylate functionality of the compound of formula III is between 0.9 and 1.3 and, more preferably, between 0.9 and 1.2.

The specific reaction mechanisms described above and the specific examples of α,ω-dihydroxy oligomer compounds, diisocyanates, α,ω-hydroxy mono(meth)acrylate functional monomer compounds and (mono)hydroxy-functional monomer compounds disclosed above, are to illustrate the present invention without limiting it. The person skilled in the art can easily and without any inventive effort use reaction methods and compounds other than those exemplified above.

Mono(meth)acrylate functional oligomers comprising at least one urethane bond are commercially available, for example, from Rahn AG, Zurich, Switzerland. GENOMER 4188 is a mixture consisting of 80 wt. % of a monoacrylate-functional polyester based oligomer comprising at least one urethane bond, and 20 wt. % of 2-ethylhexyl-acrylate; the oligomer comprised by GENOMER 4188 has a weight average molecular weight Mw of about 8,000 and the average acrylate functionality is 1±0.1.

The mono(meth)acrylate functional oligomer having at least one urethane bond, preferably has at least 2 and more preferably at least 4 urethane bonds.

The component (i) of the precursor according to the present invention preferably comprises between 1-5, more preferably between 1-4 and especially preferably between 1-3 of one or more mono(meth)acrylate functional oligomers. In a preferred embodiment of the precursor of the present invention the mass of one or more mono(meth) acrylate functional oligomers having at least one urethane bond with respect to the mass of component (i) is between 60-100% and more preferably between 80-100%.

Component (i) of the precursor of the present invention comprises between 30-75 wt. % with respect to the mass of the precursor of one or more mono(meth)acrylate functional oligomer compounds wherein at least one of said oligomer compounds comprises at least one urethane unit. The viscosity of the precursor tends to become too high if the amount of component (i) with respect to the mass of the precursor exceeds 75 wt. % so that the precursor tends to become non-printable. Using a very high percentage of component (i) of more than 75 wt. % and selecting the oligomer compounds of formula (i) so that they exhibit a very low average molecular weight, is also not possible because this tends to adversely affect the performance of the resulting pressure-sensitive adhesives. If the amount of component (i) with respect to the mass of the precursor is less than 30 wt %. the viscosity of the precursor tends to be too low, and the resulting adhesive tends to exhibit disadvantageous properties such as, for example, an insufficient coherent strength.

The free-radically radiation-curable, solvent-free and printable precursor of the present invention comprises as a second optional component (ii) one or more poly(meth)acrylate functional oligomer compounds in an amount of between 0-15 wt. % with respect to the mass of the precursor.

The poly(meth)acrylate functional oligomers useful in the present invention can be branched or essentially linear, and the (meth)acrylate functional groups can be terminal groups and/or pendant side groups bonded to the polymer backbone.

The compositions of the oligomer backbone is not critical and it can be based, for example, on a polyether, polyester, polycarbonate, polyolefin or on a copolymer thereof. It is also possible that the oligomeric backbone comprises one or more oligomeric blocks which are connected to each other, for example, by urethane bonds.

The oligomeric backbone of the poly(meth)acrylate functional oligomers of component (ii) is preferably selected so that the glass transition temperature of a homopolymer obtained by polymerising such oligomers, is between −30° and 100° C. and more preferably between −30 and 70° C.

The average molecular weight of the poly(meth)acrylate functional oligomer compounds of component (ii) is preferably between 1,000 and 35,000 and more preferably between 1,000 and 30,000.

Poly(meth)acrylate functional oligomers can be obtained by known synthetic methods. Di(meth)acrylate functional polyester oligomers can be obtained, for example, by reacting α,ω-di(carbonylhydroxy) functional polyester oligomers with diisocyanates and subsequently with α,ω-hydroxy-(meth)acrylate functional compounds such as, for example, HEA or HEMA. Di(meth)acrylate functional polyester oligomers can also be obtained by reacting α,ω-dihydroxy functional polyester oligomers with α,ω-isocyanato(meth)acrylate functional compounds such as, for example, isocyanatoethyl(meth)acrylate.

At least one of the poly(meth)acrylate functional oligomers preferably comprises at least one, more preferably at least two and especially preferably at least four urethane bonds.

Di(meth)acrylate functional oligomers comprising at least one urethane bond can be obtained, for example, by reacting the adduct from step (a)' above with an excess of one or more α,ω-hydroxy-(meth)acrylate functional compounds such as, for example, HEA or HEMA. Methods of manufacturing poly(meth)acrylate functional urethane oligomers are also disclosed, for example, in U.S. Pat. No. 5,847,021.

Poly(meth)acrylate functional oligomers comprising at least one urethane bond, are commercially available, for example, from Sartomer Co., Exton, Pa., U.S.A., as Sartomer CN 966 or Sartomer CV 965 and from Radcure Co., Louisville, Ky., U.S.A., as Ebecryl 230. Poly(meth)acrylate functional oligomers comprising at least one urethane bond, are also available from Rahn AG, Zurich, Switzerland under the GENOMER trade designation. GENOMER 4269, for example, which is used in the Examples described below is a mixture comprising 80 wt. % of a diacrylate functional polyester urethane oligomer.

Component (ii) of the precursor of the present invention comprises between 0-15 wt. % with respect to the mass of the precursor of one or more poly(meth)acrylate functional oligomer compounds. If the mass of component (ii) is higher than 15 wt. % the resulting adhesive tends to exhibit disadvantageous properties such as, for example, an insufficient peel and shear strength. For a mass of more than 15 wt. %, the resulting adhesive also typically exhibits no tack at room temperature and tends to be not a pressure-sensitive adhesive. The tack can be quantitatively assessed by the Polyken™ probe tack test described in the test section below. Fully cured precursors having a tack of less than 100 g and more preferably less than 50 g are experienced as essentially tack-free.

The free-radically radiation-curable, solvent-free and printable precursor of the present invention comprises as a third component (iii) one or more monomer compounds comprising one ethylenically unsaturated group in an amount of between 5-45 wt. %. Examples of suitable ethylenically unsaturated groups include vinyl, vinylene, allyl and, in particular, (meth)acrylate groups.

Compounds comprising one ethylenically unsaturated group which are useful in the present invention can be distinguished in view of their polarity or in view of the glass transition temperature of a homopolymer obtained by radically polymerising the respective monomer.

The term polar monomers includes both moderately polar and strongly polar monomers. Polarity (that is, hydrogen-bonding ability) is frequently described by the use of terms such as "strongly", "moderately" and "poorly". References describing these and other solubility terms include Paint Testing Manual, 3$^{rd}$ ed., G. G. Seward, Ed., American Society for Testing and Materials, Philadelphia, Pa., and "A Three-Dimensional Approach to Solubility", Journal of Paint Technology, Vol. 38, No. 496, pp. 269-280.

Suitable examples for poorly polar monomers include, for example, linear or branched monofunctional unsaturated acrylates or methacrylates of non-tertiary alkyl alcohols, the alkyl groups of which have from 4 to 15 and, in particular, from 4 to 14 carbon atoms. Examples of these lower alkyl acrylates used in the invention include but are not limited to, n-butyl acrylate, isobutyl acrylate, hexyl acrylate, 2-ethylhexyl acrylate, isooctyl acrylate, n-octyl acrylate, n-octyl methacrylate, 2-methylbutyl acrylate, isononyl acrylate, n-nonyl acrylate, isoamylacrylate, n-decyl acrylate, isodecyl acrylate, isodecyl methacrylate, isobornyl acrylate, 4-methyl-2-pentyl acrylate, dodecyl acrylate, ethoxy-ethoxyethylacrylate and 2-acrylic acid-2-((butylamino)carbonyl)oxy-ethyl ester. Preferred lower acrylate and methacrylate esters include isooctyl acrylate, n-butyl acrylate, 2-ethylhexyl acrylate, isononyl acrylate, ethoxy-ethoxyethylacrylate and dodecyl acrylate.

Moderately polar and strongly polar monomers which are suitable in the present invention include, for example, acrylic acid, methacrylic acid, acrylamides, N-vinyl lactams such as, for example, N-vinyl pyrrolidone or N-vinyl caprolactam, acrylonitrile, acryloylmorpholine and dimethyl amino-propyl methacrylate.

Low $T_G$ monomers having one ethylenically unsaturated group and a glass transition temperature of the corresponding homopolymer of less than 0° C. which are suitable in the present invention include, for example, n-butyl acrylate, isobutyl acrylate, hexyl acrylate, 2-ethyl-hexylacrylate, isooctylacrylate, caprolactoneacrylate, isodecylacrylate, tridecylacrylate, laurylmethacrylate, methoxy-polyethylenglycol-monomethacrylate, laurylacrylate, tetrahydrofurfurylacrylate, ethoxy-ethoxyethyl acrylate and ethoxylated-nonylacrylate. Especially preferred are 2-ethyl-hexylacrylate, ethoxy-ethoxyethyl acrylate, tridecylacrylate and ethoxylated nonylacrylate.

High $T_G$-monomers having one ethylenically unsaturated group and a glass transition temperature of the corresponding homopolymer of 50° C. or more which are suitable in the present invention, include, for example, N-vinylpyrrolidone, N-vinyl caprolactam, isobornyl acrylate, acryloylmorpholine, isobornylmethacrylate, phenoxyethylacrylate, phenoxyethylmethacrylate, methylmethacrylate and acrylamide. Especially preferred are N-vinylpyrrolidone, and acryloylmorpholine.

The amount of strongly and moderately polar monomer compounds comprising one ethylenically unsaturated group with respect to the mass of the compounds of component (iii) preferably is less than 20 wt. %, more preferably less than 15 wt. % and especially preferably less than 12.5 wt. %.

The amount of one or more poorly polar monomers comprising one ethylenically unsaturated group with respect to the mass of the precursor is preferably at least 3.5 wt. % and more preferably at least 5.0 wt. %.

In a preferred embodiment of the present invention, the sum of the amounts of the higher (meth)acrylate functional oligomers of component (ii) and the mono(meth)acrylate functional monomers with a $T_G$ of more than 50° C. of component (iii), is less than 17.5 wt. % and preferably less than 15 wt. % with respect to the mass of the precursor. If the average (meth)acrylate functionality of the higher (meth)acrylate functional oligomers of component (ii) is higher than 2.5, the sum of the amounts of such higher (meth)acrylate functional oligomers and the mono(meth)acrylate functional monomers with a $T_G$. of more than 50° C., preferably is less than 12.5 wt. % and especially preferably less than 10 wt. % with respect to the mass of the precursor. If the sum of the amounts of the higher (meth)acrylate functional oligomers of component (ii) and the mono(meth) acrylate functional monomers with a $T_G$ of 50° C. or more is chosen to be higher than the above limits the reaction products obtained by polymerizing the precursor tends to be not a pressure-sensitive adhesive.

In a preferred embodiment of the present invention, the amount of mono (meth)acrylate functional monomers of component (iii) with a $T_G$ of 0° C. or less is between 5 and 40 wt. %, more preferably between 10 and 35 wt. % and especially preferably between 15 and 30 wt. % with respect to the mass of the precursor.

Component (iii) of the precursor of the present invention comprises between 5-45 wt. % with respect to the mass of the precursor of one or more monomer compounds comprising one ethylenically unsaturated group. The viscosity of the precursor tends to become too low if the amount of component (iii) with respect to the mass of the precursor exceeds 45 wt. %. Using a very high percentage of component (iii) of more than 45 wt. % also tends to result in adhesives exhibiting disadvantageous values of peel strength and cohesive strength. If the amount of component (iii) with respect to the mass of the precursor is less than 5 wt %. the viscosity of the precursor tends to be too high so that the precursor tends to become non-printable. The resulting adhesive tends to be rubbery and typically does not exhibit visco-elastic properties, that is, tends to be not a pressure-sensitive adhesive.

The free-radically radiation-curable, solvent-free and printable precursor of the present invention comprises as a fourth optional component (iv) one or more monomer compounds comprising two or more ethylenically unsaturated groups in amount of between 0-5 wt. %.

Examples of suitable monomer compounds comprising two or more ethylenically unsaturated groups include $C_2$-$C_{12}$ hydrocarbondiol diacrylates such as 1,6-hexanediol diacrylate, $C_4$-$C_{14}$ hydrocarbon divinylethers such as hexanediol divinylether and $C_3$-$C_{12}$ hydrocarbontriol triacrylates such as trimethylolpropane triacrylate. Two or higher acrylate functional monomers and, in particular, di- or triacrylate-functional monomers are preferred.

In a preferred embodiment of the present invention, the amount of monomers with an unsaturated ethylene-functionality of two or more and, in particular, with an (meth) acrylate functionality of 2 or 3, is less than 4.5 wt. % and especially less than 4.0 wt. % with respect to the mass of the precursor. The sum of the amounts of the poly(meth)acrylate functional oligomers of component (ii) and the monomers of component (iv) with an unsaturated ethylene-functionality of two or more, preferably is less than 15 wt. %, more preferably less than 12.5 wt. % and especially preferably less than 10 wt. %.

Component (iv) of the precursor of the present invention comprises between 0-5 wt. % with respect to the mass of the precursor of one or more monomer compounds comprising two or more ethylenically unsaturated groups. If the mass of component (iv) is higher than 5 wt. % the resulting adhesive tends to exhibit disadvantageous properties such as, for example, an insufficient peel and shear strength.

The free-radically radiation-curable, solvent-free and printable precursor of the present invention comprises an effective amount of one or more free-radical photoinitiators. Actinic radiation from any source and of any type can be used for the curing of the precursor of the present invention whereby light sources are preferred over e-beam sources. The light can be in the form of parallel rays or divergent beams. Since many photoinitiators generating free radicals exhibit their absorption maximum in the ultraviolet (UV) range, the light source is preferably selected to emit an effective amount of such radiation. Suitable light sources include carbon arc lamps, mercury vapor lamps, fluorescent lamps comprising ultraviolet light-emitting phosphors, argon glow lamps and photographic flood lamps. Preferred are high-intensivity light sources having an intensity of at least 80 mJ/cm² and more preferably of at least 100 mJ/cm².

The amount of the free radical photoinitiator compound or compounds is selected in view of the emission characteristic and the intensity of the light source and in view of the spectral sensitivity of the free radical photoinitiators. The amount of the photoinitiators of component (v) with respect to the mass of the precursor preferably is between 0.1 and 15 wt. %, more preferably between 0.2 and 12.5 wt. % and especially preferably between 0.5 and 10 wt. %.

The photoinitiators which are suitable in the present invention include both type I and type II photoinitiators.

Type I photoinitiators are defined to essentially undergo a unimolecular bond cleavage reaction upon irradiation thereby yielding free radicals. Suitable type I photoinitiators are selected from a group consisting of benzoin ethers, benzil ketals, α-dialkoxy-acetophenones, α-hydroxyalkylphenones and acyl-phosphine oxides. Suitable type I photoinitiators are commercially available, for example, as Esacure KIP 100 from Lamberti Spa, Gallarate, Italy, or as Irgacure 651 from Ciba-Geigy, Lautertal, Germany.

Type II photoinitiators are defined to essentially undergo a bimolecular reaction where the photoinitiators interact in an excited state with a second compound acting as co-initiator, to generate free radicals. Suitable type II photoinitiators are selected from a group comprising benzophenones, thioxanthones and titanocenes. Suitable co-initiators are preferably selected from a group comprising amine functional monomers, oligomers or polymers whereby amino functional monomers and oligomers are preferred. Both primary, secondary and tertiary amines can be used whereby tertiary amines are preferred. Suitable type II photoinitiators are commercially available, for example, as Esacure TZT from Lamberti Spa, Gallarate, Italy, or as 2- or 3-methyl-benzophenone from Aldrich Co., Milwaukee, Wis., U.S.A.

Suitable amine co-initiators are commercially available, for example, as GENOMER 5275 from Rahn AG, Zurich, Switzerland.

The definitions of type I and type II photoinitiators given above, include photoinitiators which for a given composition of the precursor of the present invention undergo a unimolecular or bimolecular reaction, respectively, to a predominant extent of preferably at least 60%, more preferably at least 75% and especially preferably at least 85%.

When subjecting the precursor of the present invention to actinic irradiation and, in particular, to UV irradiation, the precursor is cured via a free-radical polymerisation mechanism. The progress of the free-radical curing reaction can be monitored by measuring the degree to which the unsaturated C—C double bonds in the (meth)acrylic functional group(s) of the oligomer components (i) and (ii), respectively, and in the ethylenically unsaturated group(s) of the monomer components (iii) and (iv), respectively, are consumed as a function of time during irradiation as is detailed in the experimental section below.

Above and below, the precursor of the present invention is termed as "fully cured" when the degree of consumption of the unsaturated C—C double bond in the (meth)acrylate group(s) of the oligomeric compounds and the ethylenically unsaturated group(s) of the monomeric compounds, respectively, of components (i)-(iv), is 90% or more. The irradiation time required for obtaining a degree of consumption of at least 90%, is referred to above and below as curing time.

The precursor of the present invention is upon full curing transformed into a pressure-sensitive adhesive. The degree of consumption of the unsaturated C—C double bond in the (meth)acrylate group of the oligomeric compounds and the ethylenically unsaturated groups of the monomeric compounds, respectively, of components (i)-(iv) in the fully cured precursor of the present invention preferably is at least 97%, more preferably at least 98.5% and especially preferably at least 99.5%.

The precursor according to the present invention can be free radically cured by actinic irradiation and especially preferably of UV light irradiation by using different curing methods.

In a first method, which is also referred to as "two step" or "closed face" curing method, the precursor is applied, for example, to the surface of a first substrate and partially cured. To this effect, the dose of irradiation applied to the precursor is only part of the dose required to fully cure the precursor. The dose of the actinic irradiation and, more preferably, of the UV irradiation during the initial partial curing step is preferably selected so that the average extent of consumption of the C—C double bond of the ethylenically unsaturated groups and the (meth)acrylic groups, respectively, preferably is about 30 to 80% and more preferably about 50 to 80%.

The dose of the actinic irradiation and, more preferably, of the UV irradiation is, independently from the determination of the extent of consumption of the C—C double bonds in the ethylenically unsaturated and (meth)acrylic group or groups, respectively, selected so that the partially cured precursor exhibits a macroscopic cold flow behaviour. The cold flow is measured by the method of measurement specified in the experimental section below. The dose of the initial irradiation is preferably selected so that the partially cured precursor exhibits a percentage change in the diameter of a sample of the radiation-curable precursor of at least 20%, preferably of at least 25% and especially preferably of at least 30% when measuring its flow resistance according to method 1 described in the test section below after a dwell time of 3 days at 23° C.

After the initial irradiation step, a second substrate is applied to the first substrate bearing the partially cured precursor, and the second substrate is preferably pressed into contact with the first one. Subsequently, the precursor is subjected to further actinic irradiation and/or, in particular, UV irradiation to fully cure the precursor.

In the two-step or closed-face curing method described above, the precursor of the pressure-sensitive adhesive can alternatively also be applied onto the surfaces of both substrates.

In the closed-face curing method at least one of the substrates needs to be at least partially transparent for the actinic irradiation used for curing, that means, in particular, for UV irradiation so that the partially cured precursor can be further cured after assembling the substrates together. The degree of transparency for actinic irradiation and, in particular, UV irradiation depends on various parameters including the absorption coefficient of the respective material of the substrate, the thickness of the substrate and the spectral composition and intensity of the irradiation. The person skilled in the art will select these parameters and the material of at least one of the substrates so that the precursor is fully cured within less than 5 min, more preferably within less than 3 min and especially preferably within less than 1 min. It was observed that as a rule of thumb the intensity of the actinic irradiation and, in particular, the UV irradiation after passing the at least partially transparent substrate, preferably is at least 50% and more preferably at least 60% with respect to the intensity of the impinging irradiation.

Suitable materials for use as a UV-transparent substrate include, for example, UV-transparent polymer materials such as polyolefins, polyesters (including polycarbonates), polyacrylates, polyurethanes and glass.

In the closed-face curing method of the present invention both type I photoinitiators or type II photoinitiators/co-initiator systems may be used, and it is also possible to use a combination of type I photoinitiators and type II photoinitiators/co-initiator systems. The use of type I photoinitiators is preferred.

The closed-face curing method of the present invention tends to provide high performance pressure-sensitive adhesive bonds which are characterized by high static shear values and by high T-peel values. It is speculated by the present inventors that these advantageous properties of the pressure-sensitive adhesive bond may be supported by the bonding mechanism where the substrates are assembled while the precursor is only partially cured and exhibits a macroscopic flow behaviour which results in good wet-out properties.

The closed-face curing method of the present invention thus provides pressure-sensitive adhesive bonds with advantageous properties while the composition of the photoinitiator component (v) of the precursor of such adhesive is less critical. On the other hand, at least one of the substrates forming an assembly needs to be at least partially transparent for the actinic irradiation and, in particular, for the UV-irradiation.

In a second method of curing the precursor of the present invention which is also referred to as "one step" or "open-face" curing method, the precursor is applied in a first step to the surface of a first substrate of an assembly and fully cured by subjecting it to actinic irradiation and preferably to UV-irradiation to provide a pressure-sensitive adhesive. In a second step, a second substrate may then be assembled to the exposed surface of the pressure-sensitive adhesive on the first substrate.

It was found by the present inventors that the one-step or open-face curing method preferably requires that the photoinitiator component (v) of the precursor of the present invention includes both at least one type I photoinitiator and at least one type II photoinitiator/co-initiator system. If no type I photoinitiator compound is included in the photoinitiator component (v) of the precursor, unfavourable curing times are obtained. In this case the resulting adhesive also tends to exhibit less advantageous values for the static shear strength. The adhesive bond obtained in case the photoinitiator component (v) of the precursor does not include any type II photoinitiator and/or any co-initiator compound, usually exhibits static shear and/or T-peel strength values which do not meet all practical requirements.

It was found by the present inventors that precursors of the present invention comprising at least one type I photoinitiator compound and at least one type II photoinitiator/ co-initiator system can be cured so that the precursor is reacted to a pressure-sensitive adhesive and/or so that the precursor is fully cured within less than 5 min, more preferably within less than 3 min and especially preferably within less than 1 min. The pressure-sensitive adhesive thus obtained exhibits advantageous properties and, in particular, advantageous values of the static shear strength and/or the T-peel strength.

The ratio of the mass of the type II photoinitiator compounds with respect to the mass of the type I photoinitiator compounds preferably varies from 0.1 to 10 and more preferably from 0.2 to 4.

It is also advantageous that both the open-face curing method and the closed-face curing method of the present invention can be performed under ambient, that is, non-inert conditions.

The photoinitiator component (v) preferably comprises from 1-3 and more preferably 1 or 2 type I photoinitiator compounds and/or, depending of the curing method applied as was described above, 1-3 and more preferably 1-2 tape II photoinitiators and, preferably, suitable co-initiators. Component (v) does preferably not comprise any photoinitiator compounds other than free-radical photoinitiators.

In a first preferred embodiment of the present invention, the precursor comprises:
55-70 wt. % of one or more compounds of component (i),
20-35 wt. % of one or more compounds of component (iii), and
an effective amount of the photoinitiator component.

The fully cured precursor of the first preferred embodiment exhibits, in particular, advantageous values of peel adhesion and tack.

In a second preferred embodiment of the present invention, the precursor comprises
40-70 wt. % of one or more compounds of component (i),
1-10 wt. % of one or more compounds of component (ii),
15-30 wt. % of one or more compounds of component (iii), and
an effective amount of the photoinitiator component.

The fully cured precursor of the second preferred embodiment exhibits, in particular, increased shear performance.

In a third preferred embodiment of the present invention, the precursor comprises
45-65 wt. % of one or more compounds of component (i),
1-10 wt. % of one or more compounds of component (ii),
15-25 wt. % of one or more compounds of component (iii) with a $T_G<0°$ C., and 1-10 wt. % of one or more compounds of component (iii) with a $T_G>50°$ C., and
an effective amount of the photoinitiator component, wherein the sum of the masses of component (ii) and the mass of the compounds of component (iii) with a $T_G>50°$ C. is <15 wt. % with respect to the mass of the precursor.

The fully cured precursor of the third preferred embodiment exhibits, in particular, increased shear performance at elevated temperatures and advantageous values of shear adhesion failure temperature from stainless steel.

The precursors of the present invention comprise (meth) acrylate functional oligomer components (i) and (ii) and ethylenically unsaturated monomer components (iii) and (iv) whereby compounds (iii) and (iv) can be considered as reactive diluents. By varying the amount of these components within the limits given in claim 1, it is possible to adjust the viscosity of the precursor so that it exhibits a dynamic viscosity at 20° C. and at a shear rate of 100 s$^{-1}$ of between 300 and 15,000 mPa·s.

Adjusting the dynamic viscosity within this range imparts printability to the precursor. A wide variety of printing methods including screen-printing, flexo-printing, gravure printing, offset printing or tampon printing can be used. Screen-printing is preferred. The person skilled in the art can easily adjust the printing parameters such as, for example, the mesh size of the printing screen in case of screen printing, in view of the viscosity value of a specific precursor.

The viscosity of the precursor can be further adjusted by including oligomeric or polymeric, respectively, non-reactive additives such as, for example, tackifiers including rosin esters, synthetic hydrocarbons and terpine resins and plasticizers. The amount of one or more tackifiers with respect to the mass of the precursor can be up to 50 wt %, more preferably up to 40 wt % and especially preferably between 0.5-35 wt %. It is also possible to include oligomeric or polymeric, respectively, additives comprising one or more photoactivatable groups. Oligomeric and polymeric, respectively, additives of this type are commercially available; exemplary additives which are to illustrate the present invention without limiting it are compiled in the section "Materials employed in the examples", subsection "Resin additives" below. Oligomeric or polymeric additives, respectively, which are useful in the present invention, preferably exhibit a ring and ball softening point of at least 50° C. The acrylic ester resin AC Resin 258, available from BASF, Ludwigshafen, Germany, is an example for a commercially available resin comprising a photoactivatable group.

The precursor of the present invention can comprise various additives such as, for example, defoaming agents, heat stabilizers, antioxidants, antistatic agents, thickeners, fillers, pigments, dyes, colorants, chain transfer agents and thixotropic agents. The amount of such additives if present, is selected so that it does not adversely affect the properties of the precursor such as, for example, its viscosity and/or the properties of the pressure-sensitive adhesive obtained upon curing.

Preferred additives include defoaming agents which can be included in an amount of between 0.01 and 10 wt % and more preferably in an amount of between 0.05 and 5 wt % with respect to the mass of the precursor in order to reduce the time required for defoaming the printed precursor.

Another preferred additive includes fillers such as, for example, hydrophilic and/or hydrophobic fumed silica, respectively, which may be added in an amount of between 0.1 and 10 wt % and more preferably in an amount of between 0.5 and 5 wt % with respect to the mass of the precursor in order to adjust the viscosity of the precursor.

The precursor of the present invention is solvent-free, that is, it does essentially not comprise any inert solvents such as, for example, methanol, acetone, dimethylsulfoxide, tetrahydronaphthalene, silanes or toluene. It is, however, possible though not preferred that the precursor comprises small amounts of one or more of such inert solvents of preferably less than 2 wt. % and more preferably of less than 1 wt. % with respect to the mass of the precursor in order to improve the wetting of the substrates.

The amount of the optional additive component comprising one or more additives preferably is between 0 wt. % and 20 wt % and more preferably between 0.1 and 15 wt % with respect to the mass of the precursor.

Above and below, percentages by weight refer to the total mass of the precursor unless indicated otherwise. The percentages by weight of the components (i)-(v) (to the extent they are present in a specific formulation), and, optionally, additives or other components of a precursor add up to 100 wt. %.

The present invention will now be further explained by the following examples which are to illustrate the invention without limiting it.

Prior to this, some test methods are described which will be used in the Examples. If not indicated otherwise, curing is effected in all Examples under ambient conditions.

Materials Employed in the Examples

Reactive Oligomers

Monoacrylate functional polyester urethane oligomer, $M_w$=8,000, available as GENOMER 4188 from Rahn AG (Zurich, Switzerland), as a mixture of 80% by weight monoacrylate functional polyester urethane acrylate oligomer and 20% by weight 2-ethylhexylacrylate.

Diacrylate functional polyester urethane oligomer, Mw=7,000, available as GENOMER 4269 from Rahn AG (Zurich, Switzerland), as a mixture of 80% by weight diacrylate functional polyester urethane acrylate and 20% by weight 2-acrylic acid 2-(((butylamino)carbonyl)oxy)ethyl ester (=GENOMER 1122, see below).

Acrylated oligo amine resin; co-initiator suitable for use with Esacure TZT, Mw=10,000, available as GENOMER 5275 from Rahn AG (Zurich, Switzerland).

Reactive Diluents

EHA—2-ethylhexylacrylate; $T_g$ of the corresponding homopolymer, −53° C.

Et-EtEA—ethoxy-ethoxyethylacrylate, available as Sartomer SR 256 from Cray Valley (Paris, France); $T_g$ of the corresponding homopolymer, −56° C., HDDA—hexanediol diacrylate 2-Acrylic acid 2-(((butylamino)carbonyl)oxy)ethyl ester, available as GENOMER 1122 from Rahn AG (Zurich, Switzerland); $T_g$ of the corresponding homopolymer, +13° C.

ACMO—Acryloylmorpholine, available from Rahn AG (Zurich, CH). $T_g$ of the corresponding homopolymer, +135° C., Photoinitiators Type 2 photoinitiator, comprising 80 wt % 2,4,6, trimethylbenzophenone and 20 wt % benzophenone, available as Esacure TZT from Lamberti SPA (Gallarate, Italy)

Acrylated oligo amine resin, Mw=10,000, available as GENOMER 5275 from Rahn AG (Zurich, Switzerland); co-initiator for Esacure TZT.

Type 1 photoinitiator, comprising 70 wt % poly [2, hydroxy-2-methyl-1-[4-(1-methylvinyl)phenyl]propan-1-one] and 30 wt % 2, hydroxy-2-methyl-1-phenyl-propan-1-one, available as Esacure KIP 100 from Lamberti SPA (Gallarate, Italy)

Resin Additives

Regalite 7100—partially hydrogenated (70%) synthetic hydrocarbon, Ring and Ball softening point (ASTM E 28) 100° C., available from Eastman Chemicals (Middleburg, The Netherlands).

Regalite 5100—partially hydrogenated (50%) synthetic hydrocarbon, Ring and Ball softening point (ASTM E 28) 100° C., available from Eastman Chemicals (Middleburg, The Netherlands).

Regalite 9100—partially hydrogenated (90%) synthetic hydrocarbon, Ring and Ball softening point (ASTM E 28) 100° C., available from Eastman Chemicals (Middleburg, The Netherlands).

Foral 105—rosin ester, Ring and Ball softening point (ASTM E 28) of 105° C., available from Eastman Chemicals (Middleburg, The Netherlands).

Acrylic ester resin—copolymerized acryloxy benzophenone derivative, Tg ca. −39° C., K-value 48-52 (ISO 1628), available as AC Resin 258 from BASF (Ludwigshafen, Germany).

Other Additives

AEROSIL 200—hydrophilic fumed silica, available from Degussa AG, (Duesseldorf, Germany).

AEROSIL R972—hydrophobic fumed silica, available from Degussa AG, (Duesseldorf, Germany).

Byk 055—silicone-free polymeric defoaming agent, available from BYK Chemie GmbH (Wesel, Germany).

Test Methods

For the Uncured Precursor of the Pressure-Sensitive Adhesive

Viscosity (Dynamic)

Viscosity of the precursor of the pressure-sensitive adhesive as a function of shear rate was measured at 20° C. using a cone and plate viscometer, commercially available as RHEOSTRESS RS75 from Thermo Haake, Karlsruhe, Germany. The dynamic viscosity was measured as a function of shear rate ($s^{-1}$) for both an upward scan (shear rate increasing with time) and a downward scan (shear rate decreasing with time). A linear scan rate of an increase (upward) or decrease (downward) of the shear rate over time of about $(4.4\ s^{-1})\ s^{-1}$ was applied. The viscosity value at a shear rate of 100 $sec^{-1}$ was taken to assess the Theological properties of the precursor of the pressure-sensitive adhesive. If the two curves obtained for the upward scan and the downward scan were different (thixotropic behaviour), the viscosity value at a shear rate of 100 $sec^{-1}$ was taken from the upward scan.

Percent Consumption of Unsaturated C—C Double Bond

The degree to which the unsaturated C—C double bonds in the (meth)acrylate functional groups of the oligomer components (i) and (ii) and the ethylenically unsaturated groups of the monomer components (iii) and (iv), respectively, were consumed during curing as a function of time was measured using Fourier Transform Infrared Spectroscopy techniques (FT IR). The signal originating from the C—C double bond of the ethylenically unsaturated group or groups of the monomer components (iii) and, optionally, (iv), usually dominates the signal originating from the C—C double bond of the (meth)acrylic group or groups of the oligomeric components (i) and, optionally, (ii) because due to the distinctly smaller geometrical extension of the monomeric compounds of components (iii) and (iv) in comparison to that of the oligomeric compounds of components (i) and (ii), the number of the monomeric molecules per volume unit (that is, concentration) and hence the number of the monomeric C—C double bonds per volume unit distinctly exceeds the number of the oligomeric molecules and hence the number of the oligomeric C—C-double bonds per volume unit. Therefore, it is usually sufficient to monitor the extinction of the signal originating from the C—C double bond of the ethylenically unsaturated group or groups of the monomer components (iii) and, optionally, (iv). For the FTIR measurements, a layer of the precursor with a thickness of 30 μm was used.

If the ethylenically unsaturated group of the monomers of component (iii) and, optionally, (iv) is an acrylate group, the degree of consumption can be measured, for example, by measuring the extinction of the signal attributable to the unsaturated C—C double bond of the acrylate group at about 810 cm$^{-1}$ as a function of time.

The percent consumption was taken as the percentage of the double bonds that disappeared during irradiation whereby the value prior to irradiation was taken as 0%.

The person skilled in the art can easily adjust this method when using monomers in components (iii) and (iv) having other ethylenically unsaturated groups such as, for example, methacrylic groups, vinyl or allyl groups. In this case, the signal of the C—C double bond to be monitored will be at a different wave number.

For Pressure-Sensisitve Adhesives Obtained by Fully Curing the Precursor

T-Peel at 23° C.

The precursor of the pressure-sensitive adhesive was applied to a 175 μm thick polyester film using a knife coater to give a layer thickness of 50 μm and cured using UV irradiation source available as Natograph Ltd—UV Dryer, Type 90-0220-T8, available from Natograph Ltd., Nothingham, UK, commonly employed for drying and curing of screen-printing inks. The polyester film, available as Melinex ST 726 from DuPont, was primed with an acrylate primer on both sides and used as received. The amount of energy incident on the layer of adhesive precursor was 600 mJ/cm$^2$ (unless otherwise indicated) as measured using a light measurement device commercially available as UVI-MAP™ UM 365H S from Electronic Instrumentation and Technology (EIT) of Sterling Va./USA. The polyester film bearing the layer of the precursor of the pressure-sensitive adhesive was then passed under the UV lamps at a line speed of 10 m/min. The sample residence time under the lamps was ca. 2 seconds which was sufficient to fully cure the precursor.

The layer of pressure-sensitive adhesive thus generated was then laminated to an additional polyester film (Melinex ST 726 as above) so that the cured pressure-sensitive adhesive layer was between two layers of polyester.

This construction was conditioned at 23° C. and 50% relative humidity for a dwell time of 24 hours. A T-peel adhesion test was then conducted according to Test Method ASTM (American Society for Testing and Materials) D1876-61T using a tensile tester at a jaw separation speed of 305 nm/min. The force required to separate the two polyester sheets was recorded in N/cm.

The test was repeated three times and the results averaged.

180° Peel from ABS

The precursor of the pressure-sensitive adhesive was applied to a polyester film and fully cured as described under the test method T-Peel at 23° C. above. Samples were tested after a dwell time of 24 h according to FINAT Test Method No. 1 (FINAT=Federation International des Fabricants et Transformateurs d'Adhesifs et Thermocollants sur Papiers et autres Supports, The Hague, Netherland).

A test plate comprising acrylonitrile-butadiene-styrene (ABS) terpolymer was employed rather than the glass test substrate called for in the method. Results were recorded in N/cm. The test was repeated 3 times and the results averaged.

Static Shear (23° C.) from ABS

A static shear test was performed after a dwell time of 24 h according to FINAT Test Method 8 (1995).

The precursor was coated as a layer with a thickness of 50 μm onto a polyester film (Melinex ST 726 from DuPont) having a thickness of 175 μm and fully cured as described under the T-Peel test method above.

The adhesive tape thus prepared was then laminated (using a 2 kg roller) to acrylonitrile-butadiene-styrene (ABS) test panels (instead of glass as called for by the method) in a manner so that the bonded area was 2.54 cm×1.27 cm. A load of 1 kg was applied to the adhesive tape and the time to bond failure was recorded in minutes.

The test was repeated and the two results were averaged.

Shear Adhesion Failure Temperature (SAFT) from Stainless Steel

Samples for the shear adhesive failure temperature test were prepared as described above under Static Shear at 23° C. The test substrate was stainless steel (rather than glass as called for by the method) and a load of 500 g was used. A bonded area of 2.54 cm×1.27 cm was employed. The shear station bearing the sample and the 500 g weight was placed in a forced air oven with a programmable temperature variation.

The oven was held at 25° C. for 10 minutes and then heated at a rate of 0.5° C. per minute to a temperature of 120° C., representing a total heating time of 3 hrs and 10 min. The time at which the adhesive bond failed and the weight dropped was recorded in minutes. The test was repeated and the two test results were averaged.

The shear adhesion failure temperature was then calculated using the formula:

$$SAFT \text{ in } °C.=0.5° C.(t-10)+25° C.$$

Polyken™ Probe Tack Test

Adhesive precursors were coated on polyester film and fully cured in a one step process using UV exposure of 600 mJ/cm$^2$ from the UV radiation source described in Example 1.

The cured adhesive layer thus prepared was subjected to the Polyken™ Probe Tack Test (described in general in ASTM Spec. Publ. 360 (1963)) and specifically in Test Method ASTM D14 "Pressure Sensitive Tack of Adhesives Using an Inverted Probe Machine".

The polished stainless steel probe with a diameter of 5 mm was allowed to contact the sample surface for a period of 1 second with a force of 0.2 N. The force required to remove the probe from the sample surface at a rate of 1 cm/s was recorded in grams. The test was repeated twice and the three results averaged.

For Partially Cured Precursors (as Obtained in Step 1 of the Closed Face or Two-Step Method)

Cold Flow (Flow Resistance)

A layer of the precursor of the pressure-sensitive adhesive of the present invention having a thickness of 50 μm, was coated on a release liner and partially cured using a dose of the actinic irradiation or, preferably, the UV-irradiation insufficient to fully cure the precursor. Then a second release liner was laminated onto the layer of the partially cured precursor.

A 48-mm diameter circular coupon of the partially cured precursor covered by the two release liners was die-cut and placed onto a flat surface of a substrate.

A weight of 500 g was placed on the coupon of the layer of the partially cured precursor between the release liners for 2 hours at 120° C. The cold flow was then measured as a percentage change in the diameter of said coupon.

EXAMPLES

Examples 1-5

The acrylate functional oligomer materials were combined in form of the commercially available mixture GENOMER 4188 and GENOMER 4269 in a glass vessel and mixed for 30 minutes. The remaining materials were added and the resulting mixture was stirred for an additional 1 hour. The amounts of the mono- and di-acrylate functional oligomers, respectively, given in Table 1, were calculated from the respective amounts of GENOMER 4188 or 4269. Likewise, the amounts of the monomer EHA and 2-acrylic acid 2-(((acryl-amino) carbonyl) oxy) ethylester (=GENOMER 1122) contained in GENOMER 4188 and 4269, respectively, are included in the respective amounts given for such monomers.

Viscosity measurements were made on the uncured precursor of the pressure-sensitive adhesive according to the cone and plate method for determining dynamic viscosity described above under Test Methods. Results of viscosity measurements are summarized in Table 1.

The precursor of the pressure-sensitive adhesive was coated onto a 175 μm thick polyester film (polyethylene terephthalate or PET, available as Melinex ST 726 from DuPont) using a notch bar coater to give a layer of the precursor having a thickness of ca. 50 μm. The precursor layer was then polymerized and fully cured using a UV dryer available as Natograph Ltd—UV Dryer, Type 90-0220-T8, available from Natograph Ltd., Nothingham, UK. The energy incident on the adhesive precursor layer was measured as 600 mJ/cm$^2$ using a light measurement device commercially available as UVIMAP™ UM 365H S from Electronic Instrumentation and Technology (EIT) of Sterling Va./USA.

The cured layer of pressure-sensitive adhesive was tested in both T-Peel and Static Shear mode, respectively, as described under TEST METHODS. Test results are summarized in Table 4.

Examples 6 and 7

Adhesive precursors having the chemical composition as shown in Table 1 were prepared, coated and fully cured by the same method as employed in Examples 1-5, with the exception that fumed silica was added to the adhesive precursor. The addition of fumed silica increased the viscosity of the uncured adhesive precursor as compared to Example 1 (Table 1) and allowed thicker adhesive coatings to be generated. The amounts of the mono- and di-acrylate functional oligomers, respectively given in Table 1, were calculated from the respective amounts of GENOMER 4188 or 4269. Likewise, the amounts of the monomer EHA and 2-acrylic acid 2-(((acryl-amino)carbonyl)oxy) ethylester (=GENOMER 1122) contained in GENOMER 4188 and 4269, respectively, are included in the respective amounts given for such monomers.

Properties of the cured pressure-sensitive adhesive layers made from the precursors of Examples 6 -7 are shown in Table 4.

TABLE 1

| Component | Ex. 1 wt. % | Ex. 2 wt. % | Ex. 3 wt. % | Ex. 4 wt. % | Ex. 5 wt. % | Ex. 6 Wt. % | Ex. 7 wt. % |
|---|---|---|---|---|---|---|---|
| Monoacrylate functional polyester urethane oligomer (as comprised in GENOMER 4188) | 49.9 | 65 | 59.5 | 62.4 | 60.5 | 49.6 | 49.6 |
| Diacrylate functional polyester urethane oligomer (as comprised in GENOMER 4269) | 8.5 | — | 5 | 2.1 | 4.0 | 8.2 | 8.2 |
| Genomer 1122 | 2.1 | — | 1.3 | 0.6 | 1.0 | 2.0 | 2.0 |
| 2-EHA 8 | 20.5 | 20.2 | 19.4 | 20.1 | 19.8 | 20.4 | 20.9 |
| Et-et-EA | 8.00 | 4.5 | 4.5 | 4.5 | 4.7 | 8.0 | 8.0 |
| HDDA | 0.5 | 0.3 | 0.3 | 0.3 | — | — | — |
| TYPE 1, KIP 100 | 2.5 | 2.5 | 2.5 | 2.5 | 2.5 | 2.5 | 2.5 |
| TYPE 2, TZT | 2.5 | 2.5 | 2.5 | 2.5 | 2.5 | 2.5 | 2.5 |
| Acrylated oligo amine resin (GENOMER 5275) | 5.0 | 5 | 5 | 5 | 5 | 5 | 5 |
| Byk 055 | 0.5 | — | — | — | — | — | — |
| Aerosil 200 | — | — | — | — | — | 1.8 | — |
| Aerosil R972 | — | — | — | — | — | — | 1.3 |
| Viscosity at 100 sec$^{-1}$, 20° C., (mPa · s) | 6,000 | 7,900 | 7,000 | 8,400 | 8,500 | 6,900 | 6,800 |

Examples 8-11

Adhesive precursor compositions shown in Table 2 were prepared employing four tackifying resins, respectively. Tackifying resins chosen did not interfere with the polymerization of the adhesive precursor, and upon full curing pressure-sensitive adhesives having slightly improved tack in combination with good shear properties were obtained as shown in Table 4. The amounts of the mono- and di-acrylate functional oligomers, respectively given in Table 2, were calculated from the respective amounts of GENOMER 4188 or 4269. Likewise, the amounts of the monomer EHA and 2-acrylic acid 2-(((acryl-amino)carbonyl)oxy)ethylester (=GENOMER 1122) contained in GENOMER 4188 and 4269, respectively, are included in the respective amounts given for such monomers.

The adhesive precursor was coated onto a polyester film at a thickness of 50 µm and fully cured according to the procedure described under Examples 1-5.

TABLE 2

| Component | Ex. 8 wt. % | Ex 9 wt. % | Ex. 10 wt. % | Ex. 11 wt. % |
|---|---|---|---|---|
| Mono acrylate functional polyester urethane oligomer (as comprised in GENOMER 4188) | 45.4 | 45.4 | 45.4 | 45.4 |
| Diacrylate functional polyester urethane acrylate oligomer (as comprised in GENOMER 4265) | — | — | — | — |
| Regalite R 7100 | 17 | — | — | — |
| Regalite 5100 | — | 17 | — | — |
| Regalite 9100 | — | — | 17 | — |
| Foral 105 | — | — | — | 17 |
| 2-EHA | 28.7 | 28.7 | 28.7 | 28.7 |
| TYPE 1, KIP 100 | 2.2 | 2.2 | 2.2 | 2.2 |
| TYPE 2, TZT | 2.2 | 2.2 | 2.2 | 2.2 |
| Acrylated oligo amine resin (GENOMER 5275) | 4.5 | 4.5 | 4.5 | 4.5 |
| Viscosity at 100 sec$^{-1}$, 20° C., (mPa · s) | 9,000 | 9,200 | 9,500 | 9,800 |

Examples 12-13

Two adhesive precursors comprising an acrylic ester resin (T$_g$ –39° C., K value 48-52 (measured according to ISO 1628) comprising a copolymerized acryloxy benzophenone derivative, available as AC Resin 258 from BASF, Ludwigshafen, Germany) were prepared according to the chemical compositions shown in Table 3. The amounts of the mono- and di-acrylate functional oligomers, respectively given in Table 3, were calculated from the respective amounts of GENOMER 4188 or 4269. Likewise, the amounts of the monomer EHA and 2-acrylic acid 2-(((acryl-amino)carbonyl)oxy)ethylester (=GENOMER 1122) contained in GENOMER 4188 and 4269, respectively, are included in the respective amounts given for such monomers.

The adhesive precursor was coated onto a polyester film at a thickness of 50 µm and fully cured according to the procedure described under Examples 1-5.

The pressure-sensitive adhesive was then tested using the T-Peel and Static Shear test methods, respectively. The results are summarized in Table 4.

TABLE 3

| Component | Ex. 12 wt % | Ex. 13 wt % |
|---|---|---|
| Mono acrylate functional polyester urethane oligomer (as comprised in GENOMER 4188) | 65.0 | 36.0 |
| Diacrylate functional polyester urethane oligomer (as comprised in GENOMER 4269) | — | — |

TABLE 3-continued

| Component | Ex. 12 wt % | Ex. 13 wt % |
|---|---|---|
| AC Resin 258 | 4.0 | 8.2 |
| Regalite R 7100 | — | 14.20 |
| 2-EHA | 21.0 | 27.5 |
| Et-et-EA | — | 4.1 |
| Photoinitiator TYPE 1, KIP 100 | 2.5 | 2.5 |
| Photoinitiator TYPE 2, TZT | 2.5 | 2.5 |
| Acrylated oligo amine resin (GENOMER 5275) | 5.0 | 5.0 |
| Viscosity at 100 sec$^{-1}$, 20° C., (mPa · s) | 9,200 | 4,600 |

TABLE 4

| Ex. | T-peel, N/cm | Static shear 23° C. (ABS), min |
|---|---|---|
| 1 | — | >10,000 |
| 2 | 4.1 | 5,800 |
| 3 | 4.3 | 2,400 |
| 4 | 3.5 | 5,600 |
| 5 | 5.7 | >10,000 |
| 6 | 3.4 | >10,000 |
| 7 | 4.9 | >10,000 |
| 8 | 7.2 | >10,000 |
| 9 | 6.5 | 9,800 |
| 10 | 5.0 | >10,000 |
| 11 | 3.7 | 3,800 |
| 12 | 6.7 | >10,000 |
| 13 | 5.6 | >10,000 |

Comparative Examples 1-3

Comparative Examples 1-3 show the effect of using only one of type I and type II photoinitiators in the precursor of the present invention The adhesive precursor was coated onto a polyester film at a thickness of 50 µm and cured according to the procedure described under Examples 1-5; the dose of UV irradiation was selected so that the precursor of Comparative Example 1 was fully cured (irradiation time of about 2 s). The same radiation dose was applied in Comparative Examples 2 and 3 and in Example 14 below.

Chemical compositions are summarized in Table 5 and test results in Table 6. The amounts of the mono- and di-acrylate functional oligomers, respectively given in Table 5 were calculated from the respective amounts of GENOMER 4188 or 4269. Likewise, the amounts of the monomer EHA and 2-acrylic acid 2-(((acryl-amino)carbonyl)oxy)ethylester (=GENOMER 1122) contained in GENOMER 4188 and 4269, respectively, are included in the respective amounts given for such monomers.

Comparative Example 1 was prepared using Esacure KIP 100 (Type I photoinitiator) but neither the type II photoinitiator Esacure TZT nor the co-initiator GENOMER 5275. Though this example was fully cured and showed a degree of consumption of the unsaturated C—C double bond of about 100%, the cohesive strength of the adhesive as reflected in the static shear value was low.

Comparative Example 2 was prepared using type II photoinitiator Esacure TZT but neither the type I photoinitiator KIP 100 nor the co-initiator GENOMER 5275. When applying the dose of UV-irradiation used in Comparative Example 1 the degree of consumption of the C—C double bond in the acrylate group was only about 53%.

Comparative Example 3 was prepared using type II photoinitiator Esacure TZT in combination with GENOMER 5275 but not the type I photoinitiator KIP 100. When applying the dose of UV-irradiation used in Comparative Example 1 the degree of consumption of the C—C double bond in the acrylate group was only about 53%.

Example 14

Example 14 shows the effect of employing both a TYPE I and a TYPE II photoinitiator in combination with the acrylated oligo amine resin (GE 5275) acting as a co-initiator (Table 5) in the adhesive precursor. The amounts of the mono- and di-acrylate functional oligomers, respectively, given in Table 5 were calculated from the respective amounts of GENOMER 4188 or 4269. Likewise, the amounts of the monomer EHA and 2-acrylic acid 2-(((acryl-amino)carbonyl)oxy)ethylester (=GENOMER 1122) contained in GENOMER 4188 and 4269, respectively, are included in the respective amounts given for such monomers.

When applying the dose of UV-irradiation used in Comparative Example 1-3 the degree of consumption of the C—C double bond in the acrylate functional groups of the precursor was about 100%. The pressure sensitive adhesive obtained also exhibits advantageous values for the T-peel strength and the static shear value, respectively (Table 6).

TABLE 5

| Component | C-Ex. 2 wt. % | C-Ex. 3 wt. % | Ex. 14 wt. % |
|---|---|---|---|---|
| Mono acrylate functional polyester urethane oligomer (as comprised in GENOMER 4184) | 68.6 | 68.6 | 62.6 | 67 |
| Diacrylage functional polyester urethane oligomer (as comprised in GENOMER 4269) | — | — | — | — |
| 2-EHA | 26.6 | 26.6 | 24.3 | 26 |
| Photoinit. TYPE 1, KIP 100 | 4.8 | — | — | 3.5 |
| Photoinit. TYPE 2, TZT | — | 4.8 | 4.4 | 1.2 |
| Acrylated oligo amine resin (GENOMER 5275) | — | — | 8.7 | 2.3 |
| Viscosity at 20° C. and 100 sec$^{-1}$, (mPa · s) | 5,700 | 5,800 | 6,200 | 6,000 |

TABLE 6

| | CURED ADHESIVE | | | |
|---|---|---|---|---|
| Ex. | Conversion in % double bonds | T-peel, N/cm | Static Shear 23° C. (ABS), min | SAFT (SS), ° C. |
| C-Ex. 1 | 99.7 | 8.3 | 20 | 31 |
| C-Ex. 2 | 53 | 0.8 | 1 | — |
| C-Ex. 3 | 67 | 2.6 | 230 | 65 |
| Ex. 14 | 99.7 | 8.1 | >10,000 | 79 |

Examples 15-17 and Comparative Examples 4-5

Examples 15-17 show additional compositions of the invention as summarized in Table 7. The amounts of the mono- and di-acrylate functional oligomers, respectively, given in Table 7 were calculated from the respective amounts of GENOMER 4188 or 4269. Likewise, the amounts of the monomer EHA and 2-acrylic acid 2-(((acryl-amino)carbonyl)oxy)ethylester (=GENOMER 1122) contained in GENOMER 4188 and 4269, respectively, are included in the respective amounts given for such monomers.

Adhesive precursors of Comparative Examples 4 and 5 were prepared using high levels of a diacrylate functional polyester urethane oligomer compound. Chemical compositions for Comp. Examples 4-5 are shown in Table 7. The adhesive precursor was coated onto a polyester film at a thickness of 50 μm and fully cured according to the procedure described under Examples 1-5.

Test results (Table 8) show that high levels of the acrylate difunctional polyester urethane oligomer compound tend to reduce the T-peel strength and, in particular, the static shear value of the resulting adhesives. It is speculated that this is due to high crosslink densities resulting from the high amounts of the diacrylate functional polyester urethane oligomer compound. The high crosslink densities also tend to reduce the tack of the polymer obtained by curing the precursor to a point where such polymer is no longer a pressure-sensitive adhesive.

TABLE 7

| Component | Ex. 15 wt. % | Ex. 16 wt. % | Ex. 17 wt. % | C-Ex. 4 wt. % | C-Ex. 5 wt. % |
|---|---|---|---|---|---|
| Monoacrylate functional polyester urethane oligomer (as comprised in GENOMER 4108) | 66.60 | 51.40 | 56.75 | 12.50 | 31.35 |
| Diacrylate functional polyester urethane oligomer (as comprised in GENOMER 4219) | — | 14.50 | 9.85 | 50.0 | 31.35 |
| 2-EHA | 21.3 | 17.4 | 18.8 | 10.3 | 14.8 |
| Et-et-EA (SR256) | 4.6 | 4.6 | 4.6 | 7.0 | 7.0 |
| Genomer 1122 | — | 4.5 | 2.5 | 12.5 | 7.8 |
| TYPE 1, KIP 100 | 1.7 | 1.7 | 1.7 | 1.9 | 1.9 |
| TYPE 2, TZT | 1.7 | 1.7 | 1.7 | 1.9 | 1.9 |
| Acrylated oligo amine resin (GENOMER 5275) | 4.1 | 4.1 | 4.1 | 3.9 | 3.9 |
| Viscosity at 20° C. and 100 sec$^{-1}$, (mPa · s) | 6,000 | 7,200 | 8,100 | 5,500 | 6,900 |

TABLE 8

| Ex. | T-peel, N/cm | Static shear 23° C. (ABS), min |
|---|---|---|
| 15 | 4.1 | 5800 |
| 16 | 3.0 | 7200 |
| 17 | 2.9 | 3600 |
| C-Ex. 4 | >0.2 | n.m. |
| C-Ex. 5 | 4.3 | Pop off | n.m. = not measurable, immediate pop off
Pop off = adhesive failure

Examples 18-19

Examples 18-19 show further precursor compositions of the invention, as summarized in Table 9, where no diacrylate functional oligomer was present. The amount of the monoacrylate functional oligomers given in Table 9, was calculated from the amount of GENOMER 4188. Likewise, the amount of the monomer EHA and 2-acrylic acid 2-(((acryl-amino)carbonyl)oxy)ethylester (=GENOMER 1122) contained in GENOMER 4188 is included in the respective amounts given for such monomers. The adhesive precursor was coated onto a polyester film at a thickness of 50 μm and fully cured according to the procedure described under Examples 1-5.

Test results on polymerized pressure-sensitive adhesives made by exposing the precursor to UV light according to the open face method under ambient conditions are shown in Table 10.

TABLE 9

| Component | Ex. 18 wt. % | Ex. 19 wt. % |
|---|---|---|
| Monoacrylate functional polyester urethane oligomer (as comprised in GENOMER 4188) | 66.6 | 36.0 |
| Diacrylate functional polyester polyurethane oligomer (as comprised in GENOMER 4269) | — | — |
| AC Resin 258 | — | 8.0 |
| Regalrez 7100 | — | 14.0 |
| 2-EHA | 21.3 | 26.5 |
| Et-et-EA | 4.6 | 4.1 |
| TYPE 1, KIP 100 | 1.7 | 2.3 |
| TYPE 2, TZT | 1.7 | 2.3 |
| Acrylated oligo amine resin (GENOMER 5275) | 4.1 | 4.9 |
| Viscosity at 20° C. and 100 sec$^{-1}$ (mPa · s) | 7,600 | 12,500 |

TABLE 10

| Ex. | T-peel, N/cm | Static shear 23° C. (ABS), min |
|---|---|---|
| 18 | 4.1 | 5,800 |
| 19 | 6.0 | 4,000 |

Example 20

A series of experiments was performed to show the effect of the irradiation time and/or irradiation dose on the polymerization and curing of the precursor of the pressure-sensitive adhesive. The chemical composition of Example 2 was employed in these experiments and curing was monitored by measuring the consumption of the unsaturated C—C-double bond of the acrylate groups of the precursor as a function of time.

The precursor of the pressure-sensitive adhesive was subjected to UV-irradiation using the equipment described under Examples 1-5 above.

Properties of the resulting adhesives were then measured by both T-peel and Static Shear at 23° C. (ABS). The test results are shown in Table 11. In particular, the first experiment (with a UV irradiation time of only 0.7 seconds) showed that the adhesive precursor was not sufficiently polymerized or crosslinked to give cohesive strength required of an adhesive bond.

The precursor of Example 2 exhibits a curing time of approximately 2 sec.

TABLE 11

| Precursor employed | Irradiation time, secs. | Total light dose received, mJ | T-peel, N/cm | Static Shear 23° C. (ABS), min | Consumption of C—C double bonds, in % |
|---|---|---|---|---|---|
| Ex. 2 | 0.7 | 200 | 4.0 | 5 | 73.0 |
| Ex. 2 | 2.0 | 600 | 6.0 | ca. 10,000 | 98.0 |
| Ex. 2 | 2.8 | 800 | 6.5 | >10,000 | 99.7 |

Examples 21-24

Additional examples of the invention comprising low levels of a high Tg monomer, acryloylmorpholine (ACMO), were prepared. The chemical compositions of Examples 21-24 are summarized in Table 12. The amounts of the mono- and di-acrylate functional oligomers, respectively, given in Table 12, were calculated from the respective amounts of GENOMER 4188 or 4269. Likewise, the amounts of the monomer EHA and 2-acrylic acid 2-(((acryl-amino)carbonyl)oxy)ethylester (=GENOMER 1122) contained in GENOMER 4188 and 4269, respectively, are included in the respective amounts given for such monomers.

The precursor was first prepared, applied to a polyester film substrate (PET, Melinex ST 726) at a thickness of 50 μm and partially cured according to the closed face or two step method using the UV curing equipment described under Examples 1-5 to provide a UV radiation exposure of 200 mJ/cm². The polyester film substrate bearing the partially cured adhesive layer was then assembled to a second substrate (Melinex ST 726 polyethylene terephthalate film) and then cured with a UV radiation exposure of 800 mJ/cm² that reached the adhesive layer through one of the transparent polyester films so that precursor was fully cured and converted into a pressure-sensitive adhesive.

The properties of the resulting adhesive bonds between two polyester film substrates were evaluated by T-Peel, Static Shear and Shear Adhesion Failure Temperature (SAFT) test methods, respectively, and the test results summarized in Table 13.

The curing method applied in Examples 21-24, thus was the closed face curing method.

TABLE 12

| Component | Ex. 21 wt % | Ex. 22 wt % | Ex. 23 wt % | Ex. 24 wt % |
|---|---|---|---|---|
| Monoacrylate functional polyester urethane oligomer (as comprised in GENOMER 4188) | 51.2 | 55.0 | 54.9 | 59.3 |

TABLE 12-continued

| Component | Ex. 21 wt % | Ex. 22 wt % | Ex. 23 wt % | Ex. 24 wt % |
|---|---|---|---|---|
| Diacrylate functional polyester urethane oligomer (as comprised in GENOMER 4269) | 9.5 | 3.5 | 10.2 | 3.8 |
| 2-EHA | 18.5 | 17.9 | 19.8 | 19.3 |
| Et-et-EA (SR256) | 5.6 | 4.2 | 6.1 | 4.5 |
| ACMO (acryloylmorpholine) | 3.8 | 8.8 | 4.1 | 9.5 |
| Genomer 1122 | 2.4 | 0.9 | 2.5 | 0.9 |
| TYPE 1, KIP 100 | 2.3 | 2.4 | 2.4 | 2.6 |
| TYPE 2, TZT | 2.3 | 2.4 | — | — |
| Acylated oligo amine resin | 4.5 | 4.8 | — | — |
| Viscosity at 100 sec$^{-1}$, and 20° C., (mPa · s) | 6,500 | 7,200 | 5,800 | 6,100 |

TABLE 13

| Ex. | T-peel, N/cm | Static shear 23° C. (ABS), min | SAFT (SS), ° C. |
|---|---|---|---|
| 21 | 5.3 | >10,000 | 55 |
| 22 | 4.6 | >10,000 | 60 |
| 23 | 7.9 | >10,000 | 50 |
| 24 | 9.2 | >10,000 | 55 |

Examples 25-26

Examples 25-26 were carried out by applying precursors of pressure-sensitive adhesives of the invention to substrates using industrial screen printing and UV curing equipment.

The adhesive precursors, described above under Examples 1 and 19, respectively, were applied to a polyester film (Melinex ST 726) using a flat screen printing device having a 800 mm×800 mm 165 mesh screen, available from Thieme GmbH & Co. KG (Teningen, Germany).

Curing was conducted in one step according to the open face curing method using two UV lamps (available as SVECIA SUVD from Svecia Screenprinting AB, Stockholm, Sweden) at a line speed of 2.9 m/min resulting in a total of 600 mJ/cm$^2$ UV energy applied to the adhesive precursor. Under these conditions, the precursor was fully cured and converted into a pressure-sensitive adhesive.

TABLE 14

| Component | Ex. 25 wt % | Ex. 26 wt % |
|---|---|---|
| Monoacrylate functional polyester urethane oligomer (as comprised in GENOMER 4188) | 50 | 36 |
| Diacrylate functional polyester urethane oligomer (as comprised in GENOMER 4269) | 8.6 | — |
| 2-EHA | 20.5 | 26.5 |
| Et-et-EA | 8.0 | 4.1 |
| AC Resin 258 | — | 8.0 |
| Regalrez 7100 | — | 14.0 |
| Genomer 1122 | 2.1 | 0.9 |
| TYPE 1, KIP 100 | 2.2 | 2.3 |
| TYPE 2, TZT | 2.2 | 2.3 |
| HDDA | 0.44 | — |
| Byk 55 | 1.34 | 1.0 |
| Acrylated oligo amine resin (GENOMER 5275) | 4.5 | 4.9 |
| Viscosity at 100 sec$^{-1}$, and 20° C., (mPa · s) | 5,700 | 10,000 |

TABLE 15

| Ex. | T-peel, N/cm | Static Shear 23° C. (ABS), min | 180° Peel (ABS), N/cm |
|---|---|---|---|
| 25 | 3.9 | >10,000 | 4.2 |
| 26 | 6.0 | 4,000 | 4.5 |

Example 27

Figure 1:
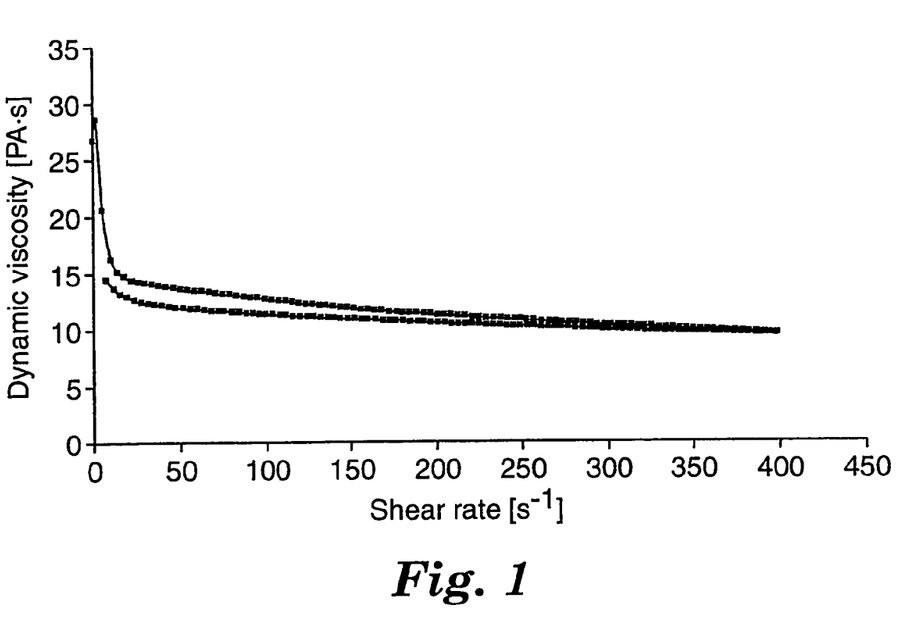
FIG. 1 shows the dynamic viscosity of the precursor of Example 19 as a function of shear rate wherein the upper curve represents an upward scan (increasing shear rate with time) and the lower curve represents a downward scan (decreasing shear rate with time), respectively.

The vicosity of the adhesive precursor described above in Example 19 was measured as a function of shear rate using the cone and plate method described under Test Methods. The result is shown in FIG. 1 below. It was observed that the precursor exhibited a thixotropic behaviour because the traces for the upward scan (increasing shear rate with time, upper curve) and the downward scan (decreasing shear rate with time, lower curve) do not match. It is speculated that this is due to the presence of the relatively high molecular weight AC Resin 258. The dynamic viscosity at a shear rate of 100 s$^{-1}$ was taken from the upward scan (upper curve).

TABLE 16

| Shear rate, sec$^{-1}$ | Viscosity, mPa · s |
|---|---|
| 0.12 | 26,700 |
| 99 | 12,800 |
| 200 | 11,300 |
| 301 | 10,400 |
| 350 | 9,800 |

The invention claimed is:

1. Free-radically radiation-curable, solvent-free and printable precursor of a pressure-sensitive adhesive, the precursor comprising:
   (i) 30-75 wt. % of one or more monofunctional oligomer compounds, wherein said monofunctional oligomer compounds are mono(meth)acrylate functional oligomer compounds at least one of said oligomer compounds comprising at least one urethane bond,
   (ii) 0-15 wt. % of one or more poly(meth)acrylate functional oligomer compounds,
   (iii) 5-45 wt. % of one or more UV-curable monomer compounds comprising one ethylenically unsaturated group,
   (iv) 0-5 wt. % of one or more UV-curable monomer compounds comprising two or more ethylenically unsaturated groups, and
   (v) an effective amount of one or more free radical photoinitiators,
wherein the percentages which are percentages by weight with respect to the mass of the precursor, are selected so that the precursor has a dynamic viscosity at 20° C. and at a shear rate of 100 s$^{-1}$ of between 300 to 15,000 mPa·s, and wherein the UV-curable monomers of components (iii) and (iv) comprise at least one UV-curable monomer compound the homopolymerisate of which comprises a glass transition temperature Tg of less than 0° C. in an amount of up to 40 wt. % with respect to the mass of the precursor.

2. Precursor according to claim 1 wherein the precursor comprises at least one type I photoinitiator essentially undergoing a unimolecular bond cleavage reaction upon irradiation, at least one type II photoinitiator and at least one co-initiator interacting with said type II photoinitiator essentially in a bimolecular reaction upon irradiation.

3. Precursor according to claim 1 wherein the ratio of the mass of one or more mono(meth)acrylate functional oligomer compounds having at least one urethane bond to the mass of the mono(meth)acrylate functional oligomer compounds of component (i) of the precursor, is between 60 and 100%.

4. Precursor according to claim 1 wherein the average molecular weight of the mono(meth)acrylate functional oligomer compounds of component (i) is between 1,500 and 35,000.

5. Precursor according to claim 1 wherein the glass transition temperature of a homopolymer obtained by polymerising the mono(meth)acrylate functional oligomers having at least one urethane bond, is between −30 to 70° C.

6. Precursor according to claim 1 wherein the at least one UV-curable monomer compounds of components (iii) and (iv) the homopolymerizate of which has a glass transition temperature Tg of less than 0° C., is selected from the group comprising n-butyl acrylate, isobutyl acrylate, hexyl acrylate, 2-ethyl-hexyl acrylate, isooctyl acrylate, caprolactone acrylate, isodecyl acrylate, tridecyl acrylate, lauryl methacrylate, methoxy-polyethyleneglycol-monomethacrylate, lauryl acrylate, tetrahydrofurfuryl-acrylate, ethoxy-ethoxyethylacrylate, ethoxylated-nonylacrylate.

7. Precursor according to claim 1 wherein the UV-curable monomers of components (iii) and (iv) comprise at least one UV-curable monomer the homopolymerisate of which comprises a Tg of more than 50° C. in an amount of up to 10 wt. % with respect to the mass of the precursor.

8. Precursor according to claim 7 wherein said at least one monomer is selected from a group comprising N-vinylpyrrolidone, N-vinyl caprolactam, isobornyl acrylate, acryloylmorpholine, isobornylmethacrylate, phenoxyethylacrylate, phenoxyethylmethacrylate, methylmethacrylate and acrylamide.

9. Precursor according to claim 2 wherein the type I photoinitiator compounds are selected from a group consisting of benzoin ethers, benzil ketals, α-dialkoxy-acetophenones, α-hydroxyalkylphenones and acyl-phosphine oxides.

10. Precursor according to claim 2 wherein the type II photoinitiator compounds are selected from a group comprising benzophenones and thioxanthones and wherein the co-initiator compounds interacting with said type II photoinitiator compounds are selected from a group comprising amines.

11. Precursor according to claim 2 which further comprises one or more additives selected from the group consisting of oligomeric or polymeric non-reactive additives such as tackifiers, oligomeric or polymeric additives having a photoactivatable group, defoaming agents, heat stabilizers, antioxidants, antistatic agents, thickeners, fillers, pigments, dyes, colorants, chain transfer agents and thixotropic agents.

12. Method of adhering a substrate being at least partially transparent to actinic irradiation and/or UV-irradiation to another substrate comprising the steps of:
    (i) applying the precursor according to claim 1 to one of the substrates,
    (ii) subjecting the precursor to actinic and/or UV irradiation using a radiation dose so that the precursor is cured only partly,
    (iii) interrupting the treatment with actinic and/or UV irradiation and assembling the two substrates against each other with the partly polymerized precursor being sandwiched between the two substrates, and
    (iv) subjecting the assembly to actinic and/or UV irradiation through the UV-transparent substrate using a radiation dose sufficiently high to fully cure the precursor.

13. Method of preparing a pressure-sensitive adhesive claim 1 to a substrate, and
    (ii) subjecting the precursor to actinic and/or UV irradiation to fully cure the precursor.

14. Method of adhering a first substrate to a second substrate comprising the steps of:
    (i) preparing a pressure-sensitive adhesive on a first substrate according to the method of claim 13, and
    (ii) adhering the second substrate to the exposed pressure-sensitive adhesive on the first substrate.

15. Method according to claim 12 wherein the precursor is applied onto the substrate by printing.

16. Method according to claim 12 wherein the precursor is applied as a layer having a thickness of between 30 and 250 μm.

17. Method according to claim 12 wherein the curing by exposure to actinic and/or UV irradiation of the layer is performed under ambient conditions.

18. Pressure-sensitive adhesive which is obtainable by fully curing a precursor according to claim 1 by exposure to actinic and/or UV irradiation.

19. Assembly comprising two substrates bonded by a fully cured precursor according to claim 1.

20. Precursor according to claim 1, wherein the UV-curable monomer compounds comprising one ethylenically unsaturated group are UV-curable monomer compounds comprising only one ethylenically unsaturated group.

* * * * *

UNITED STATES PATENT AND TRADEMARK OFFICE
CERTIFICATE OF CORRECTION

PATENT NO. : 7,268,173 B2 Page 1 of 1
APPLICATION NO. : 10/513125
DATED : September 11, 2007
INVENTOR(S) : Andreas H. Graichen It is certified that error appears in the above-identified patent and that said Letters Patent is hereby corrected as shown below:

Column 1
Line 67, delete "however," and insert -- however. --, therefor.

Column 5
Line 23, delete "cylic" and insert -- cyclic --, therefor.

Column 14
Line 15, delete "high-intensivity" and insert -- high-intensity --, therefor.

Column 18
Line 13, delete "terpine" and insert -- terpene --, therefor.

Column 21
Line 12, delete "sensisitive" and insert -- sensitive --, therefor.
Line 44, delete "nm/min." and insert -- mm/min. --, therefor.

Column 24, in Column 7 of (Table 1)
Line 2, delete "Wt." and insert -- wt. --, therefor.

Column 32
Line 12, delete "vicosity" and insert -- viscosity --, therefor.

Column 34
Line 20, in Claim 13, after "adhesive" insert -- according to --.

Signed and Sealed this

Twentieth Day of May, 2008

JON W. DUDAS
*Director of the United States Patent and Trademark Office*